United States Patent
Seddon (10) Patent No.: US 8,302,804 B2
(45) Date of Patent: Nov. 6, 2012

(54) INVENTIONS RELATING TO DRINKING VESSELS (75) Inventor: Jon Seddon, Surrey Hills (AU)

(73) Assignee: Jackel Holdings Victoria Pty Ltd, Rydalmere (AU), as Trustee for Jackel HB Acquisition Trust ( * ) Notice: Subject to any disclaimer, the term of this patent is extended or adjusted under 35 U.S.C. 154(b) by 571 days.

(21) Appl. No.: 12/279,025

(22) PCT Filed: Feb. 13, 2007

(86) PCT No.: PCT/AU2007/000151
§ 371 (c)(1),
(2), (4) Date: Aug. 11, 2008

(87) PCT Pub. No.: WO2007/092995
PCT Pub. Date: Aug. 23, 2007

(65) Prior Publication Data
US 2009/0039094 A1 Feb. 12, 2009

(30) Foreign Application Priority Data
Feb. 13, 2006 (AU) ................................ 2006900686

(51) Int. Cl.
B65D 51/16 (2006.01)
A47G 19/22 (2006.01)
(52) U.S. Cl. .............. 220/714; 220/203.01; 220/203.11; 220/662; 220/669; 220/705; 220/709; 220/713
(58) Field of Classification Search ............ 220/203.01, 220/203.11, 705, 709, 713, 714, 716, 717; D7/509
See application file for complete search history.

(56) References Cited

U.S. PATENT DOCUMENTS

| 4,245,752 | A | | 1/1981 | Prueher |
| D365,499 | S | * | 12/1995 | Welker ........................... D7/509 |
| 6,325,236 | B1 | | 12/2001 | Wong |
| 6,793,075 | B1 | * | 9/2004 | Jeter ........................... 206/459.1 |
| 6,994,225 | B2 | * | 2/2006 | Hakim ......................... 215/11.4 |
| 7,350,666 | B2 | * | 4/2008 | Essebaggers ................. 220/714 |
| 7,533,783 | B2 | * | 5/2009 | Choi et al. .................... 220/714 |
| 7,556,172 | B2 | * | 7/2009 | Lane ............................. 220/714 |
| D611,301 | S | * | 3/2010 | Amano ......................... D7/509 |
| 2002/0158075 | A1 | * | 10/2002 | Caldicott et al. ............. 220/714 |
| 2005/0045647 | A1 | * | 3/2005 | Hession et al. ............... 220/714 |
| 2006/0151499 | A1 | * | 7/2006 | Lieberman et al. ...... 220/203.11 |

FOREIGN PATENT DOCUMENTS

| EP | 1 530 935 | 5/2005 |
| GB | 2 401 858 | 11/2004 |
| GB | 2 414 470 | 11/2005 |
| WO | WO 02/098756 | 12/2002 |
| WO | WO2005021387 A2 | 3/2005 |

* cited by examiner

Primary Examiner — Anthony Stashick
Assistant Examiner — Madison L Poos
(74) Attorney, Agent, or Firm — Husch Blackwell LLP (57) ABSTRACT A lid (18) for a drinking container (14) includes an engagement means (26) for removably securing the lid (18) to the drinking container (14). The lid (18) is formed as a one piece unit and has a deformable spout (20) with a liquid outlet (46). The one piece lid is further provided with an air inlet (22) for the ingress of air into the container (14). Defamation of the spout (20) effects opening of the liquid outlet (46) and the air inlet (22). The spout (20) may be disposed in a forward position on the lid (18). The container wall may lean in the forwards direction when the container is seated on its base (16) on a level surface.

39 Claims, 7 Drawing Sheets

INVENTIONS RELATING TO DRINKING VESSELS

FIELD OF THE INVENTION

The present invention relates to drinking vessels. In particular, although not exclusively, the invention relates to training/starter cups for use by infants which have graduated from a baby bottle and are not yet able to effectively drink out of an open cup without risk of spilling the contents. Such training cups generally comprise a liquid container with a lid, the lid incorporating a spout, while the liquid container may have handles. A training cup as such enables an infant to graduate from a baby bottle to an open cup.

BACKGROUND OF THE INVENTION

A number of training cups are known. One particular type of cup includes a liquid container with a lid which has a spout. The spout incorporates liquid outlets which can only be opened by suction from the infant. Typically, such training cups are difficult for infants to use because of the amount of suction required to open the liquid outlet is quite high.

The foregoing prior art discussion is not to be taken as an admission of common general knowledge.

It is an object of the present invention to provide a training cup which assists with the development of a child's drinking skills or at least provides public with a useful choice.

SUMMARY OF THE INVENTION

In accordance with a first aspect of the present invention there is provided a dispensing portion for a drinking vessel including:
  a deformable spout having a liquid outlet;
  an air inlet spaced from the liquid outlet; and
  a bridging portion extending substantially between the liquid outlet and the air inlet such that deformation of the spout effects opening of the air valve.

The dispensing portion may be embodied in a unitary vessel. However, in a preferred form, the dispensing portion is embodied in a lid for a liquid container. The lid and container may be completely separate. Alternatively, the lid could be joined by means of an integral flexible hinge. In a most preferred form of the invention, the dispending portion is embodied in a lid for a cup such as a training cup.

The spout may be deformable under mechanical action. Such mechanical action might include biting on the exterior of the spout or applying lip pressure so as to squeeze together the side walls of the spout. Such mechanical action may result in opening of the liquid outlet. In a preferred form of the invention, the spout is such that the liquid outlet is not able to be opened by suction alone and requires mechanical deformation in order to open the liquid outlet.

The bridging portion may comprise an integral formation with the dispensing portion. For example, the integral formation may form part of the moulded lid. An appropriate construction may include a ridge, one or more ribs or alternatively a channel. Preferably, the formation extends along the side wall of the spout to the air valve. The side wall at this point may be outwardly concave. The air inlet may be disposed at the base of the side wall.

The liquid outlet may comprise one or more openings formed in a membrane. The membrane may be formed of different material to the remainder of the spout and thus may have different properties. The membrane may be overmoulded into the spout. Preferably, the membrane is the same material as the remainder of the spout and the dispensing portion but is thinner than the remainder of the spout. In a preferred form, the membrane is a flat planar structure at the top of the spout. The one or more openings may be in the form of a plurality of slits. Preferably the slits have a long dimension aligned with the usual direction of force applied during deformation.

Similarly, the air valve may comprise one or more openings formed in a membrane. The membrane may have different material properties and may be overmoulded into the dispensing portion. Alternatively, the membrane may merely be thinner than the surrounding material of the dispensing portion. In the embodiment where the liquid outlet and the air valve comprise membranes, the bridging formation may extend from the edge of the liquid outlet membrane to the edge of the air valve membrane.

In accordance with a second aspect of the present invention there is provided a lid for a drinking container, the lid including an engagement means for removably securing the lid to the drinking container, the lid being a one piece unit having a deformable spout with a liquid outlet, the one piece lid further provided with an air inlet for the ingress of air into the container, wherein deformation of the spout effects opening of the liquid outlet and the air inlet.

In accordance with a third aspect of the present invention there is provided a lid for a drinking container, the lid including:
  a dispensing portion including a deformable spout which incorporates an integrally formed slit valve for a liquid outlet, the dispensing portion also incorporating an integrally formed air valve; and
  a surround portion having engagement means for engagement with the drinking container for removably securing the lid to the drinking container, wherein the surround portion is less flexible than the dispensing portion.

In accordance with a fourth aspect of the present invention there is provided a lid for a drinking container, the lid including:
  a dispensing portion including a deformable spout which incorporates an integrally formed slit valve for liquid exit; and
  a surround portion having engagement means for engagement with the drinking container for removably securing the lid to the drinking container, wherein the surround portion is constructed of a less flexible material than that of the dispensing portion, the dispensing portion and the surround portion having been integrated by overmoulding.

In accordance with a fifth aspect of the present invention there is provided a dispensing portion for a drinking vessel, the dispensing portion being a unitary construction of flexible material and including:
  a deformable spout having a liquid outlet in the form of one or more slits which have a longitudinal dimension aligned with the line of force applied to the spout during normal usage; and
  an air inlet valve spaced in the line of force from the liquid outlet, having one or more slits each extending with a length direction transverse to the line of force,
  such that deformation of the deformable spout effects opening of the slits in the air inlet valve and the liquid outlet.

Any of the features described above in the first aspect may be applied to the second to fifth aspects of the invention.

In accordance with a sixth aspect of the present invention there is provided a drinking vessel having a spout disposed on an upper portion of the vessel in a forward position; and a container portion for liquid, the container portion having a base and a container wall which leans in a forwards direction when the container is seated on its base on a level surface.

The spout may be in the form of a tubular protrusion from the upper portion. The tubular protrusion may be angled such that its upper end extends forwardly. The tubular protrusion of the spout may be integrally moulded into a lid which is separable from the container portion in the form of a separate liquid container. The lid may include any of the features described above in accordance with the first aspect of the present invention.

The drinking vessel may be provided with handle portions which lie at an angle substantially aligned with the leaning angle of the container portion. The combination of the angled spout, container and handles assists the infant in coordinating the action of gripping the handles and tipping the vessel to orientate the vessel into the infant's own mouth.

A base portion may be provided to seat the leaning container portion. The base portion may be separable from the leaning container portion. Alternatively, the base portion and the container portion may be integrally formed. In a most preferred form of the invention, the container portion and the base portion are made of different materials with the container portion being transparent so that the contents are visible.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

BRIEF DESCRIPTION OF THE DRAWINGS

In order that the invention may be more fully understood, one embodiment will now be described by way of example with reference to the figures in which:

FIG. 15K is a rear view of the spout of FIG. 15J;

DETAILED DESCRIPTION OF THE EMBODIMENT

Figure 1:
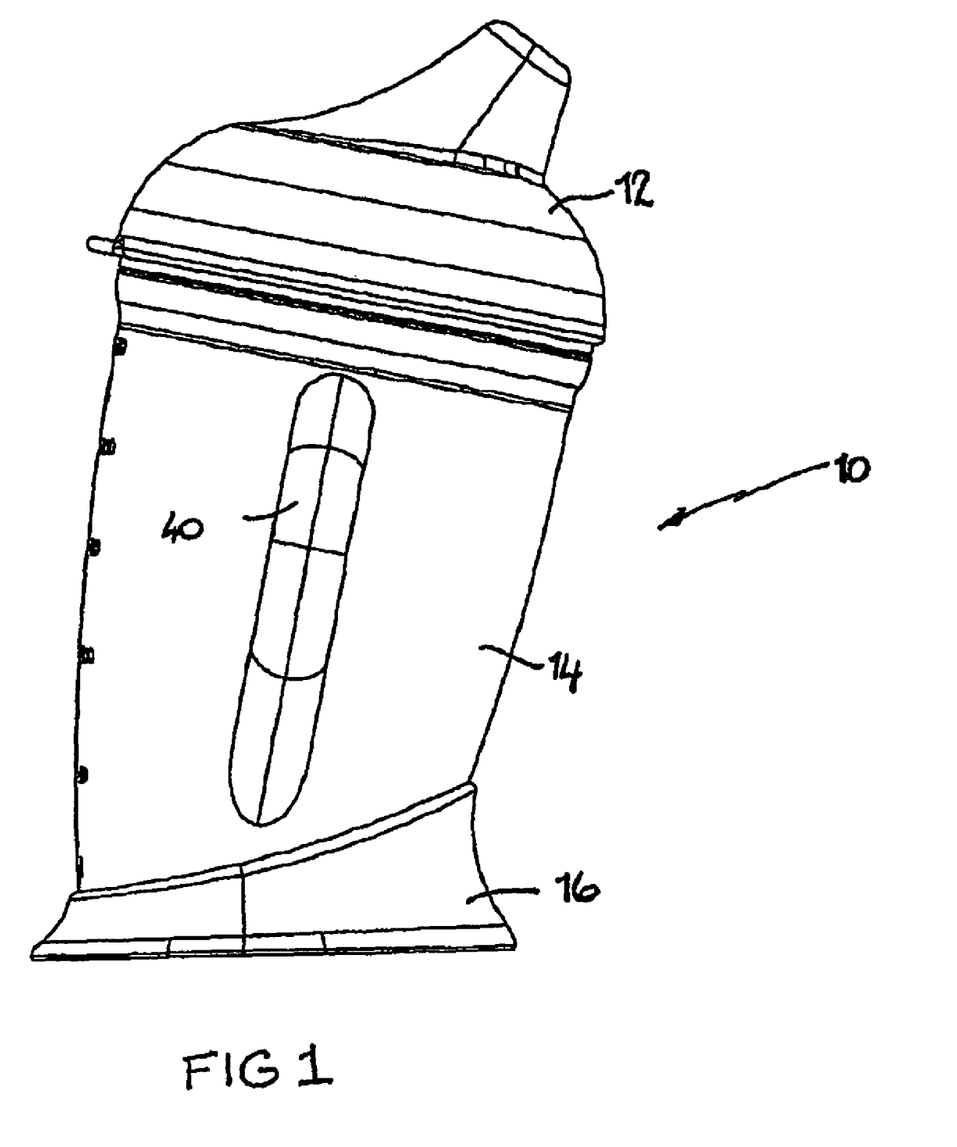
FIG. 1 is a side view of a training cup according to a preferred embodiment of the present invention.

As shown in FIG. 1, the training cup 10 includes a cover portion 12 and a container portion 14 which is supported by base portion 16. The cover portion 12 extends over the top of a lid portion 18 as can be most clearly seen in FIG. 3.

The dispensing portion 17 of the lid portion 18 is constructed of a relatively flexible material such as rubber or a thermoplastic elastomer. The dispending portion 17 incorporates a spout 20 and surrounds an air valve 22 provided on an upper surface of the lid portion, behind the spout 20, substantially at the base thereof. The dispensing portion 17 is surrounded by a peripheral flange portion 24. The flange portion 24 is constructed of a less flexible material than the dispensing portion 17 to enable the lid 18 to be securely attached to the container portion 14. The peripheral flange portion 24 is thus provided with internal screw threads 26 which are complementary to external screw threads 28 provided on the container portion 14. The dispensing portion 17 and the peripheral flange portion 24 may be united in an overmoulding process so as to form a unitary lid 18. From FIG. 3, it can be seen that an outer periphery 19 of the dispensing portion 17 overlaps an inner periphery 23 of the peripheral flange portion 24. The air valve 22 is disposed adjacent these overlapping portions 19, 23, inside the inner periphery 23.

In an overmoulding process, the two parts may be moulded together by injecting two different types of plastics material from separate barrels, i.e. twin barrels. Alternatively, in a process which is also referred to as insert moulding, a part may be inserted into a mould and another part moulded around it. Thus, the flexible dispensing portion 17 may be preformed and then inserted into a mould, enabling the surrounding flange portion 24 to be moulded around the dispensing portion 17. Or vice versa.

Figures 2, 3:
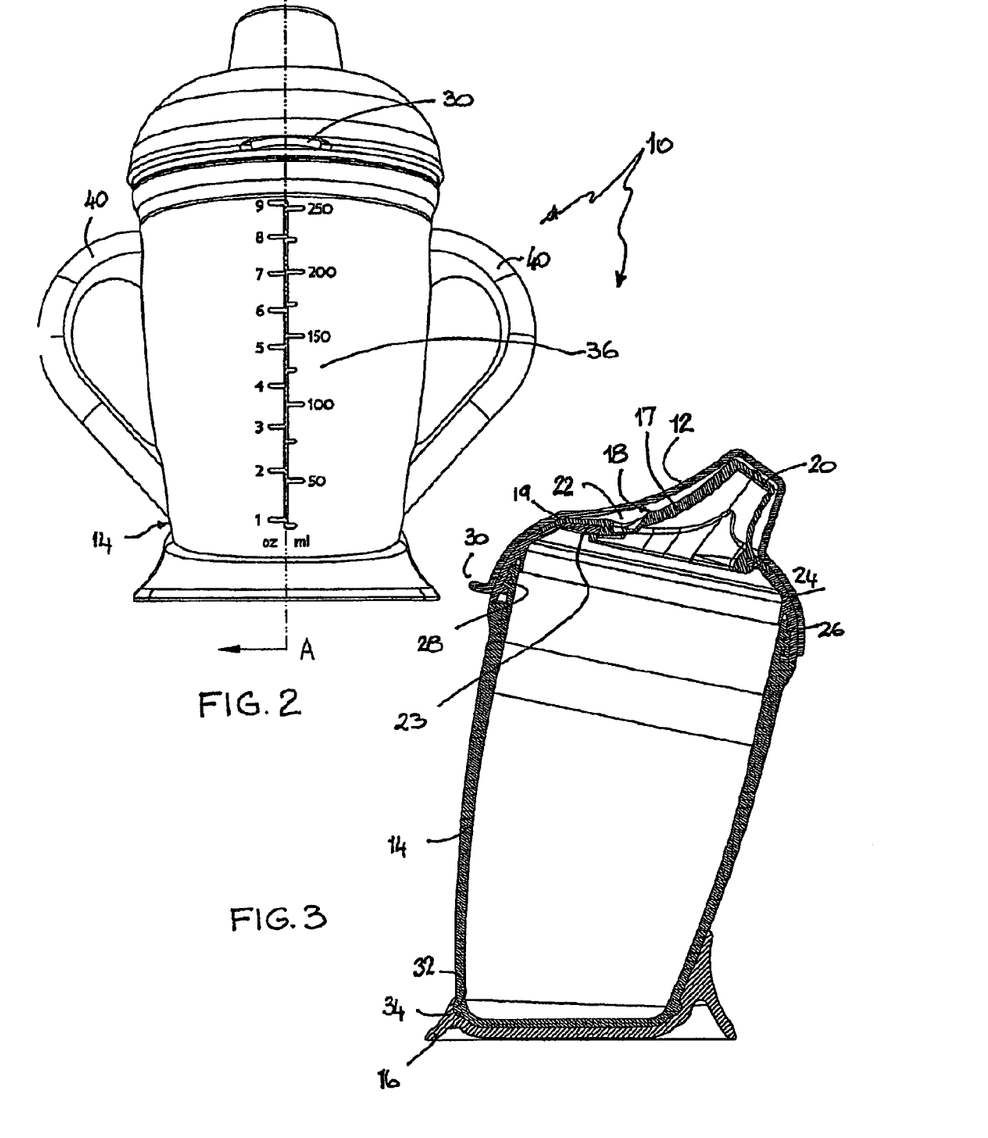
FIG. 2 is a rear view of the training cup of FIG. 1.
FIG. 3 is a cross-sectional view of the training cup through A-A of FIG. 2.

It can be seen that the cover portion 12 has a shape which is generally complementary to the external shape of the lid 18. The cover may be secured to the lid 18 by purely a frictional fit. A rearward projecting tab 30 is provided on the cover portion 12 to assist removal.

The container portion 14 is received in a base portion 16 as shown in FIG. 3. The external periphery of a lower portion of the container portion 14 is complementary to the internal periphery of the base portion 16. In particular, the container portion may have an externally projecting annular rib 32 which mates with an annular grove 34 provided in the base portion 16. The container portion 14 and the base portion 16 may be united in the moulding process. Alternatively, they may be separable to allow separate cleaning. The base portion 16 may be moulded of a plastics material which is more flexible than the container portion 14 to provide grip onto the surface onto which the cup 10 is placed. The base portion 16 may be constructed of the same material as the dispensing portion 17 of the lid 18. The base portion 16 and the container portion 14 may be united by an overmoulding process or adhered together.

FIG. 2 is a rear view of the training cup 10. The container portion 14 may be transparent so the contents are visible from the outside. The rear 36 of the container wall is provided with level indicia so that the volume of the liquid can be easily ascertained. Handles 40 are integrally moulded on opposite sides of the container wall.

Considering FIG. 3, it can be seen that the forward part of the lid contains a spout 20 which is inclined so .that its tip is foremost. The container wall is then shaped so that the front and rearward portions of the container wall are inclined forwardly. Put another way, the container has a cylindrical wall with a central longitudinal axis. When the cup 10 is seated on its base portion 16 on a level surface, the central longitudinal axis extends at a leaning angle (acute) to true vertical. Furthermore, the handles 40 are also inclined in the same or similar orientation to the central longitudinal axis. This inclination assists the child in orienting the spout towards the child's lips and assists in the co-ordination of grabbing the handles 40, lifting and tipping the cup 10 and inserting the spout 20 into the child's mouth. The spout 20 might be arranged at the same or similar angle to the central longitudinal axis.

Figure 4:
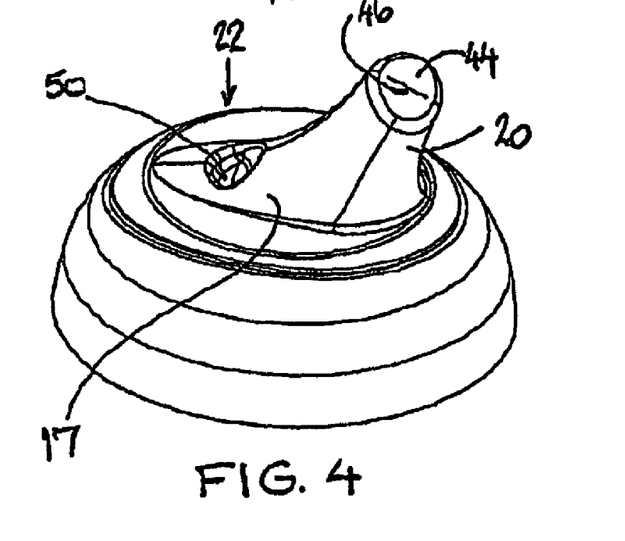
FIG. 4 is a top perspective view of the lid of the training cup.
Figure 5:
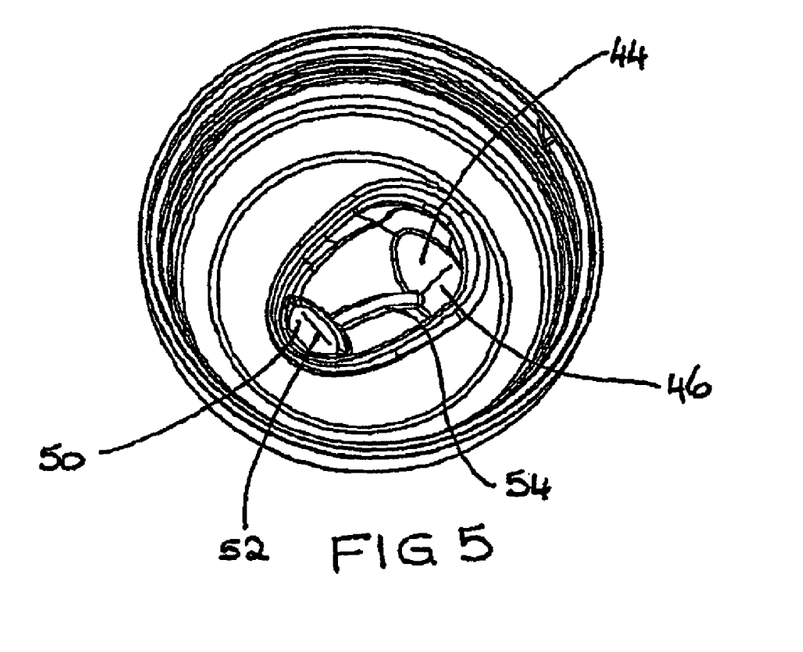
FIG. 5 is an underside perspective view of the lid of FIG. 4.
Figures 6, 7:
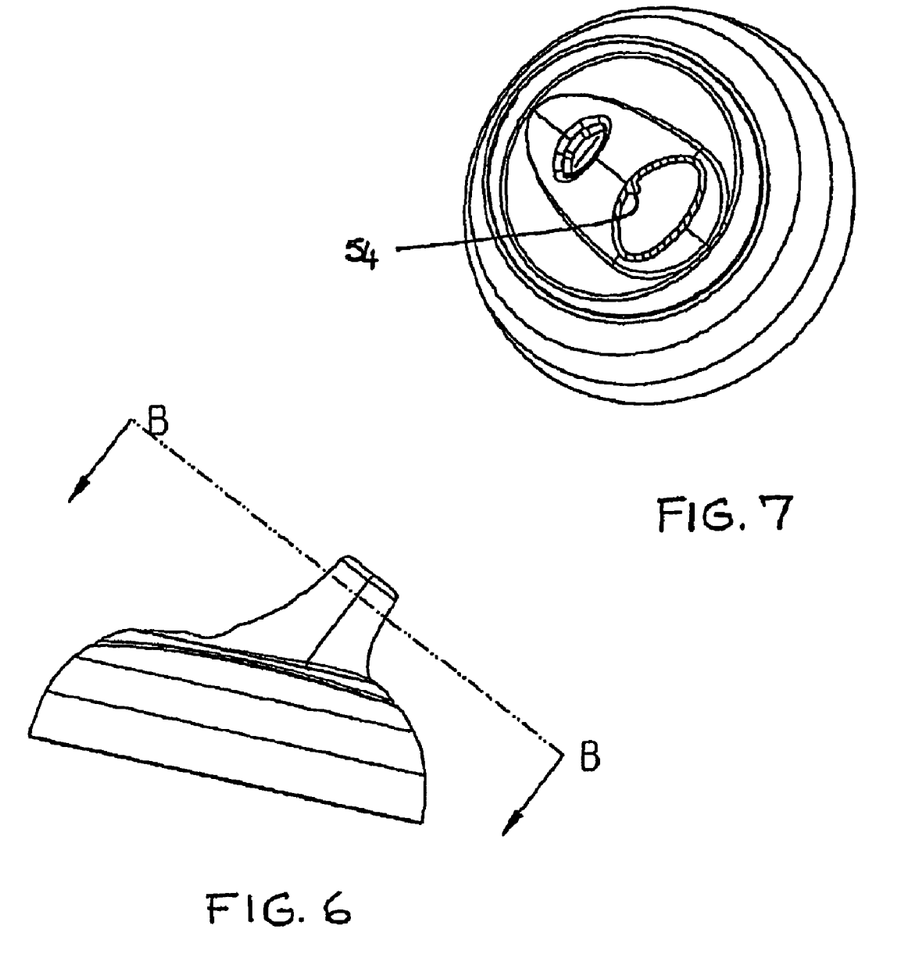
FIG. 6 is a side view of the lid of FIG. 4.
FIG. 7 is a sectional view through B-B of FIG. 6.
Figure 8:
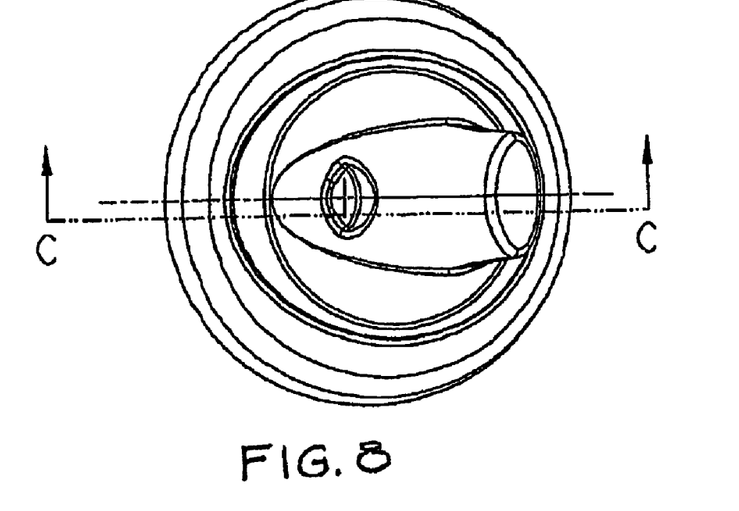
FIG. 8 is a top view of the lid.
Figure 9:
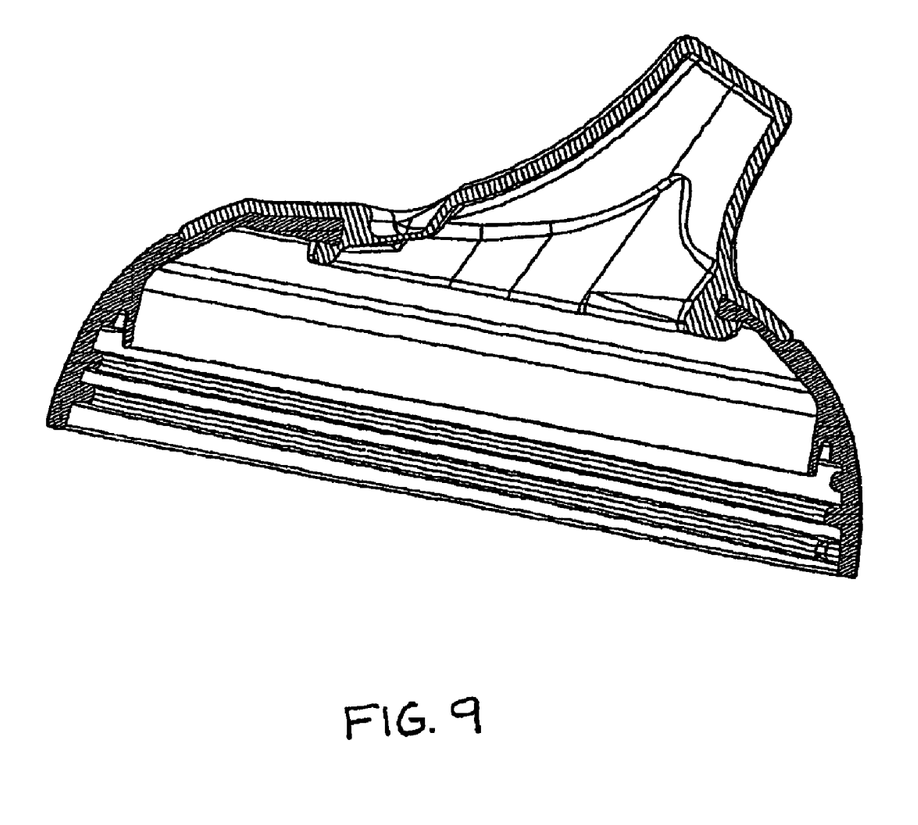
FIG. 9 is a cross-sectional view of the lid through C-C of FIG. 8.

As shown in FIG. 4, the upper end of the spout 20, is provided with a flat, planar membrane 44. The membrane 44 is thinner and thus more flexible than the dispensing portion out of which the spout 20 is made. The membrane 44 includes a slit 46 providing a liquid opening. Normally, the facing walls of the slit 46 abut each other providing a liquid seal. However, when the side walls of the spout at opposite ends of the slit 46 are pressed together in the child's mouth, the slit 46 is opened thereby providing a liquid outlet.

In a similar fashion to membrane 44, an air valve membrane 50 is provided as part of air valve 22. The membrane 50 is thinner and thus more flexible than the surrounding dispensing portion 17. The membrane 50 has a slit 52 which has its length direction oriented transversely to the length direction of slit 46.

A bridging formation in the form of internal ridge 54 integrally formed on the underside of the spout 20 extends from the edge of membrane 44 to the edge of membrane 50 and thus bridges between the two membranes. On deformation of the spout 20, the ridge 54 assists with opening of the slit 52 and thus allows air to enter the cup as liquid is being drawn out the slit 46. The ridge 54 interconnects the two membranes 44, 50 such that squeezing together of the front and rear walls of the spout 20 causes a pulling along the ridge 54 which acts on the air valve membrane 50, thus separating the facing walls of the slit to open the air valve 22. The ridge assists in preserving the form of the spout wall between the two membranes 44, 50 and to prevent stretching.

FIGS. 10 to 15F illustrate modified form of a child's training cup 10'. The form of the cup is similar in many respects to the training cup illustrated in FIGS. 1 to 10.

Accordingly, the same numerals will be used to represent parts which are the same. Where parts have undergone modification to adapt to the new embodiment, such parts will be represented by the same numeral accompanied by a (').

Figures 10, 11:
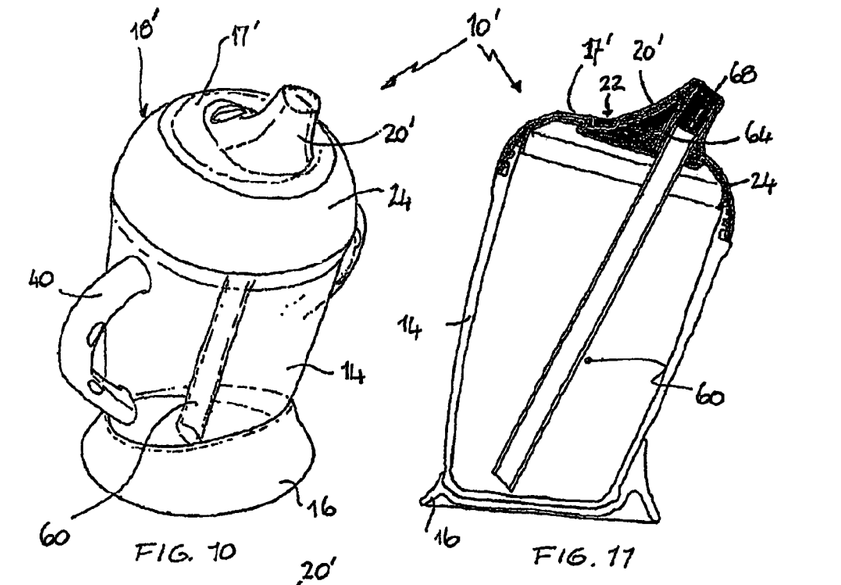
FIG. 10 is a perspective view of a modified form of the training cup illustrated in FIGS. 1 to 9, with the lid accommodating a straw.
FIG. 11 is a cross-sectional view of the training cup illustrated in FIG. 10.
Figures 12, 13, 14:
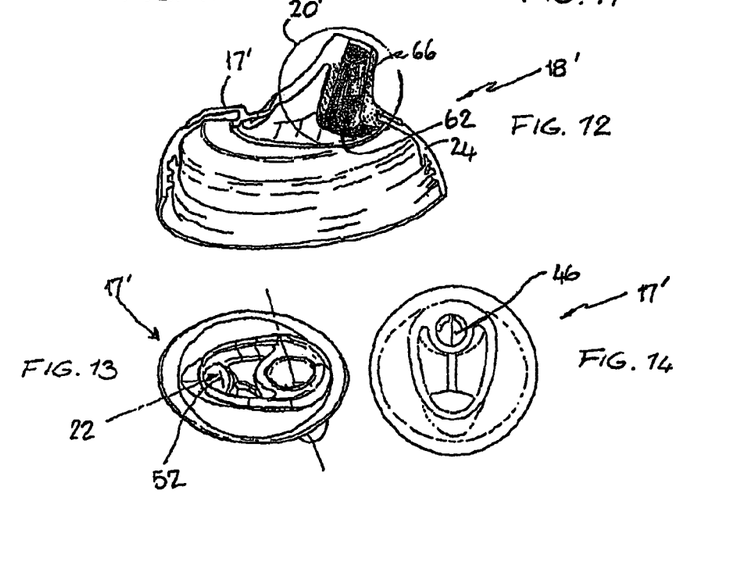
FIG. 12 is a schematic sectional view showing a detail of the lid.
FIG. 13 is an underside view of the dispensing portion of the lid shown in FIG. 12.
FIG. 14 is a bottom view showing the dispensing portion of FIG. 13.

The main modification present in the training cup 10' is the addition of a straw 60. The straw 60 may be removably connected with the spout 20' as shown in FIG. 11 so that the training cup 10' may either be used as a tipping cup without the straw 60 or as a non-tipping cup with the straw 60. This lends greater versatility to the training cup 10' since there will be situations where a child will be unable to tip his head e.g. in a car seat.

The main modification to the training cup 10' is found in the dispensing portion 17' in lid 18'. The underside of the spout 20' has been provided with a cylindrical recess 62 (see FIG. 12) into which the straw 60 may be received. The cylindrical recess 62 is defined by a dependent cylindrical wall 64 (see FIG. 11). To define the limit of insertion of the straw, a location rib 66 forms a stop, beyond which the straw 60 may not be inserted into the spout 20'. As will be appreciated from a study of FIG. 11, this provides an upper zone 68 which is free of the straw so that the spout 20' may still be mechanically deformed in order to open the air valve 22.

Figures 15A, 15B, 15C, 15D, 15E, 15F, 15G, 15H, 15I, 15J, 16:
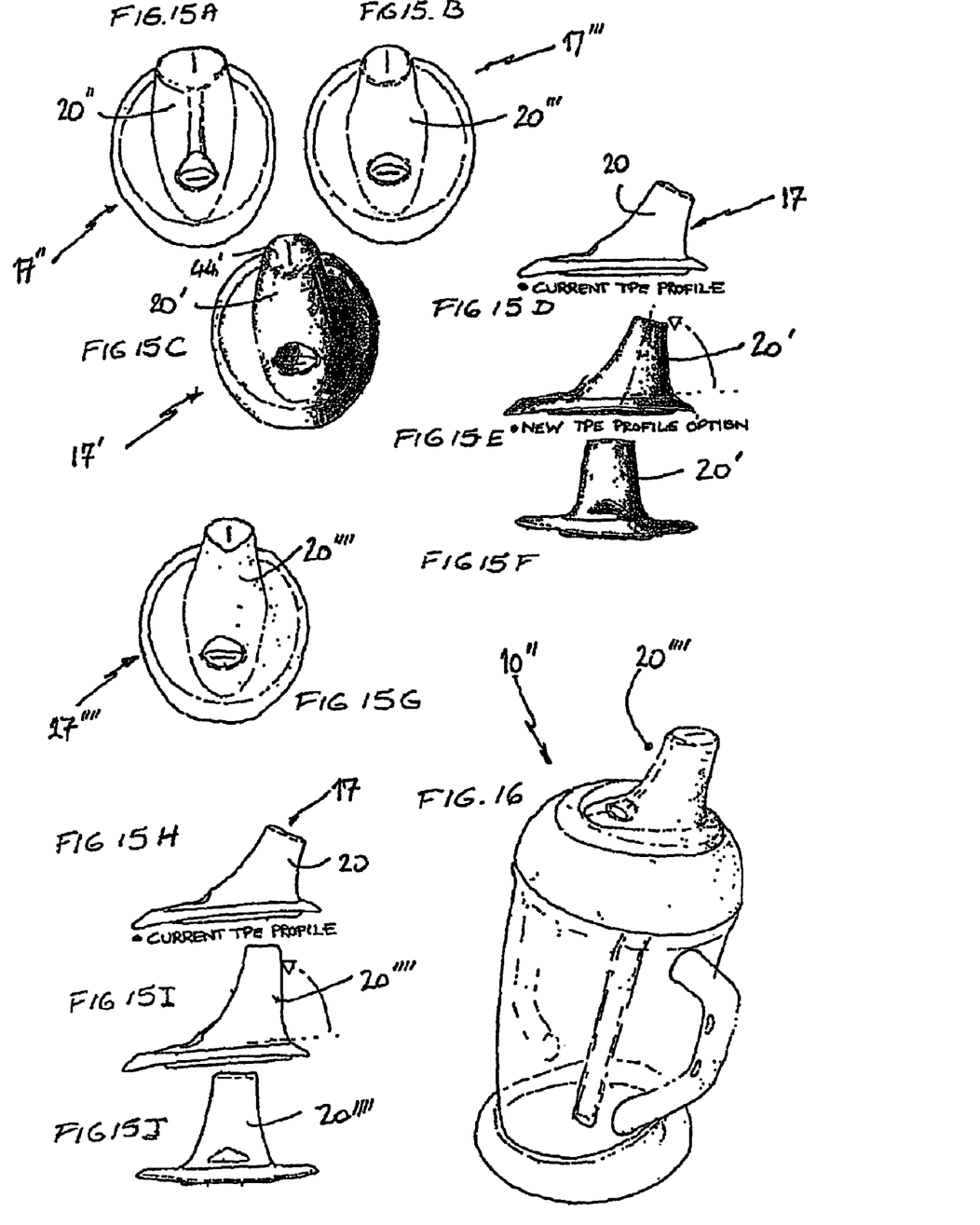
FIG. 15A is a top view of the dispensing portion of FIG. 13 showing a first form of spout.
FIG. 15B is a view similar to FIG. 15A showing a modified form of the spout.
FIG. 15C is a view similar to FIG. 15A showing yet another form of the spout.
FIG. 15D is a side view of the dispensing portion of the training cup of FIGS. 1 to 9.
FIG. 15E is a side view showing a modified profile of the spout.
FIG. 15F is a rear view of the dispensing portion showing the form of the spout.
FIG. 15G is a top view of the dispensing portion, similar to FIG. 15A but instead for the elderly or infirm.
FIG. 15H is a view the same as FIG. 15D.
FIG. 15J is a side view of the dispensing portion of FIG. 15G showing the modified profile of the spout.
FIG. 16 illustrates a cup for the elderly and infirm which incorporates the dispensing portion of FIGS. 15G, 15J and 15K.

The shape of the spout 20' is more clearly shown in FIGS. 15C, 15D and 15E. The upper end of the spout 20 is provided with a flat planar membrane 44' which is no longer oval but in a teardrop shape as shown in FIG. 15C. By comparing 15E to FIG. 15D, it can be seen that the modified spout 20' has become thinner and more upright compared to the original spout 20.

FIGS. 15A and 15B show other possible shapes for the spout 20" and 20'''. The modified form of the dispensing portion 17" is shown in FIG. 15A. The modified form of the dispensing portion 17''' is shown in FIG. 15B.

FIGS. 15G to 15K and FIG. 16 show a modified form of the cup 10" which is not for infants but for the elderly or the infirm. The modified form of the dispensing portion 17"" is shown in FIGS. 15G, 15J and 15K. The spout 20"" has been made larger and more erect than that in the previous versions.

The foregoing describes only on embodiment of the present invention and modifications may be made thereto without departing from the scope of the present invention.

The invention claimed is:

1. A lid for a drinking container, the lid including an engagement means for removably securing the lid to the drinking container, the lid being a one piece unit having a deformable spout with a liquid outlet formed in a membrane, the one piece lid further provided with an air inlet for the ingress of air into the container, the air inlet being formed in a membrane and spaced from the liquid outlet, and a bridging portion extending substantially between the liquid outlet and the air inlet, wherein the bridging formation extends from an edge of the liquid outlet membrane to an edge of the air valve membrane, wherein deformation of the spout effects opening of the liquid outlet and the air inlet.

2. The lid as claimed in claim 1 wherein the spout has one or more side walls and the air inlet is disposed at a base of one of the side walls.

3. The lid as claimed in claim 2 wherein the side wall extending towards the air inlet is outwardly concave.

4. The lid as claimed in claim 3 wherein a bridging portion extends along the side wall toward the air inlet.

5. The lid as claimed in claim 4 wherein the bridging portion is integrally formed with the spout.

6. The lid as claimed in claim 5 wherein the bridging portion comprises one of the following: a ridge; one or more ribs; and a channel.

7. The lid as claimed claim 6 wherein the spout is provided with an upper wall in which the liquid outlet is disposed.

8. The lid as claimed in claim 7 wherein liquid outlet membrane is thinner than the remainder of the spout.

9. The lid as claimed in claim 8 wherein the air inlet membrane is thinner than the surrounding material of the lid.

10. The lid as claimed in claim 1 wherein the liquid outlet is in the form of one or more slits which each have a longitudinal dimension aligned with a line of force applied to the spout during normal usage.

11. The lid as claimed in claim 1 wherein the air inlet is in the form of a slit which extends transversely to a line of force applied to the spout during normal usage.

12. The lid as claimed in claim 1 wherein the lid comprises a dispensing portion and a surround portion, the spout and the air inlet being embodied in the dispensing portion and the engagement means being embodied in the surround portion, the surround portion being less flexible than the dispensing portion.

13. The lid as claimed in claim 1 wherein the spout is adapted to receive a straw on an underside of the spout.

14. The lid as claimed in claim 12 wherein the dispensing portion and the surround are integral by having been over-moulded together.

15. A drinking vessel incorporating a container and the lid as claimed in claim 1 wherein the lid is discrete from the container.

16. The drinking vessel of claim 15 wherein the deformable spout is disposed on an upper portion of the vessel in a forward position; the container having a base and a container wall which leans in a forwards direction when the container is seated on its base on a level surface.

17. The drinking vessel as claimed in claim 16 wherein the container wall has a central longitudinal axis which extends at a leaning angle to true vertical when the container is seated on its base on a level surface.

18. The drinking vessel as claimed in claim 17 wherein the container has a tubular wall.

19. The drinking vessel as claimed in claim 17 wherein the container is provided with handle portions which lie at an angle substantially aligned with the leaning angle of the container.

20. The drinking vessel as claimed in claim 16 wherein the deformable spout is in the form of a tubular protrusion from the upper portion, the tubular protrusion being angled such that its upper end extends forwardly.

21. The drinking vessel as claimed in claim 16 wherein the spout is moulded into the lid.

22. The drinking vessel as claimed in claim 16 wherein the base is comprised of a more flexible material than the container.

23. The drinking vessel as claimed in claim 16 wherein the container is transparent so that a content is visible.

24. The drinking vessel as claimed in claim 16 wherein the spout is adapted to receive a straw on an underside of the spout.

25. The drinking vessel as claimed in claim 16 wherein the spout is formed with a cylindrical recess in which to receive a straw, the cylindrical recess including an internal rib defining a limit for insertion of the straw.

26. A dispensing portion for a drinking vessel including:
a deformable spout having a liquid outlet formed in a membrane;
an air inlet spaced from the liquid outlet and formed in a membrane; and
a bridging portion extending substantially between the liquid outlet and the air inlet, wherein the bridging formation extends from an edge of the liquid outlet membrane to an edge of the air valve membrane such that deformation of the spout effects opening of the air inlet.

27. The lid as claimed in claim 26 wherein the spout is formed with a cylindrical recess in which to receive the straw, the cylindrical recess including an internal rib defining a limit for insertion of a straw.

28. The dispensing portion as claimed in claim 27 wherein the bridging portion comprises one of the following: a ridge; one or more ribs; and a channel.

29. The dispensing portion as claimed in claim 27 wherein the liquid outlet membrane is thinner than the remainder of the spout.

30. The dispensing portion as claimed in claim 29 wherein the air inlet membrane is thinner than a surrounding material of the dispensing portion.

31. The dispensing portion as claimed in claim 27 wherein the liquid outlet is in the form of one or more slits which each have a longitudinal dimension aligned with a line of force applied to the spout during normal usage.

32. The dispensing portion as claimed in claim 27 wherein the air inlet is in the form of a slit which extends transversely to a line of force applied to the spout during normal usage.

33. A lid for a drinking container incorporating the dispensing portion as claimed in claim 27.

34. A dispensing portion for a drinking vessel, the dispensing portion being a unitary construction of flexible material and including:
a deformable spout having a liquid outlet in the form of one or more slits which have a longitudinal dimension aligned with a line of force applied to the spout during normal usage, the liquid outlet being formed in a membrane; and
an air inlet valve spaced from the liquid outlet and formed in a membrane, in a direction of the line of force and having at least one slit extending with a length direction transverse to the line of force; and a bridging portion extending substantially between the liquid outlet and the air inlet valve, wherein the bridging formation extends from an outer edge of the liquid outlet membrane to an outer edge of the air valve membrane;
such that deformation of the deformable spout effects opening of the slits in the air inlet valve and the liquid outlet.

35. The dispensing portion as claimed in claim 34 wherein the bridging portion is an integral formation with the deformable spout.

36. The dispensing portion as claimed in claim 35 wherein the bridging portion comprises an internal ridge.

37. The dispensing portion as claimed in claim 34 wherein the liquid outlet membrane is thinner than the remainder of the spout.

38. The dispensing portion as claimed in claim 37 wherein the air valve membrane is thinner than the surrounding material of a dispensing portion.

39. A lid for a drinking container incorporating the dispensing portion of claim 34.

* * * * *